United States Patent
Stevens et al.

(10) Patent No.: US 8,359,240 B2
(45) Date of Patent: *Jan. 22, 2013

(54) AUTOMATING INVENTORY MANAGEMENT OF CONSUMER ITEMS

(75) Inventors: J. Clarke Stevens, Broomfield, CO (US); Carol L. Stimmel, Boulder, CO (US)

(73) Assignee: Comcast MO Group, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,658

(22) Filed: Jun. 7, 2011

(65) Prior Publication Data

US 2011/0238522 A1 Sep. 29, 2011

Related U.S. Application Data

(63) Continuation of application No. 09/396,612, filed on Sep. 15, 1999, now Pat. No. 7,979,309.

(51) Int. Cl.
*G06Q 30/00* (2006.01)

(52) U.S. Cl. ............ 705/26.4; 705/27.1; 705/28; 705/29

(58) Field of Classification Search ........................ None
See application file for complete search history.

(56) References Cited

U.S. PATENT DOCUMENTS

| | | | |
|---|---|---|---|
| 4,908,761 A * | 3/1990 | Tai | 705/14.26 |
| 5,047,614 A * | 9/1991 | Bianco | 235/385 |
| 5,664,110 A | 9/1997 | Green et al. | |
| 6,026,376 A | 2/2000 | Kenney | |
| 6,101,483 A | 8/2000 | Petrovich et al. | |
| 6,246,997 B1 * | 6/2001 | Cybul et al. | 705/16 |
| 6,249,773 B1 * | 6/2001 | Allard et al. | 705/26.8 |
| 6,249,774 B1 * | 6/2001 | Roden et al. | 705/28 |
| 6,470,323 B1 * | 10/2002 | Suzuki et al. | 705/26.1 |
| 6,513,017 B1 * | 1/2003 | Howard et al. | 705/28 |
| 7,171,378 B2 * | 1/2007 | Petrovich et al. | 705/26.43 |
| 7,464,050 B1 * | 12/2008 | Deaton et al. | 705/14.1 |
| 2001/0001145 A1 * | 5/2001 | Barnett et al. | 705/14 |
| 2006/0195358 A1 * | 8/2006 | Muldoon | 705/14 |
| 2006/0219780 A1 * | 10/2006 | Swartz et al. | 235/383 |

* cited by examiner

*Primary Examiner* — F. Zeender
*Assistant Examiner* — Christopher Buchanan
(74) *Attorney, Agent, or Firm* — Banner & Witcoff, Ltd.

(57) ABSTRACT

A method and system for automating the management of an inventory of consumer items at a consumer location uses a programmed device that accepts input data and executes control logic for automating inventory management. At least one shopping list is received, a shopping list trend is established, and a smart list is generated with the control logic, in accordance with the shopping list trend, such that the smart list predictive of a next shopping list.

20 Claims, 5 Drawing Sheets

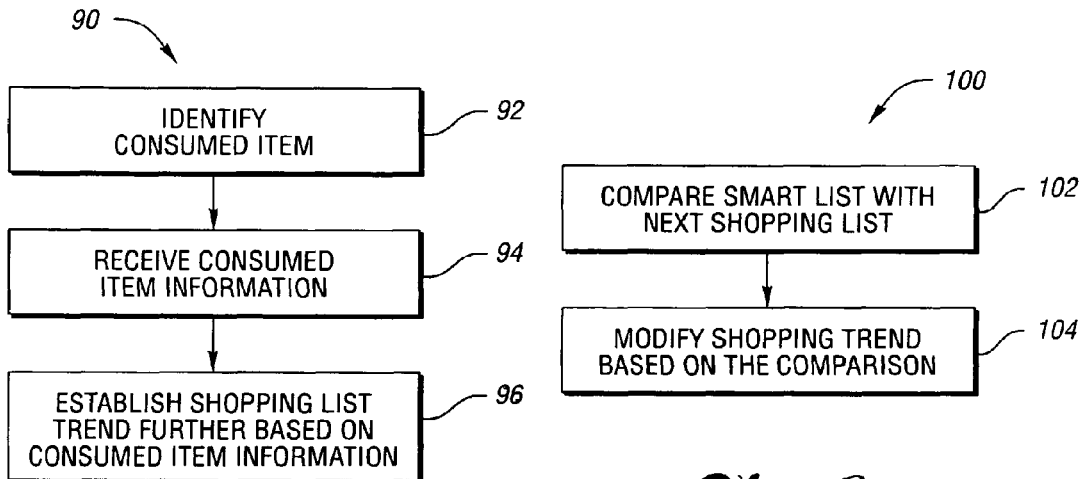
Fig. 5
Fig. 6
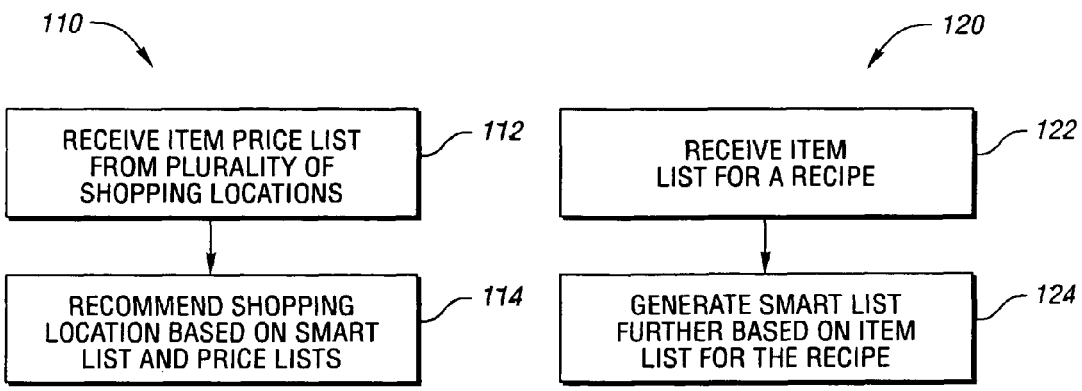
Fig. 7
Fig. 8

AUTOMATING INVENTORY MANAGEMENT OF CONSUMER ITEMS

CROSS-REFERENCE TO RELATED APPLICATIONS

This application claims the benefit of U.S. patent application Ser. No. 09/396,612, which was filed Sep. 15, 1999, and entitled "Method and System for Automating Inventory Management of Consumer Items," and which is incorporated by reference herein in its entirety.

TECHNICAL FIELD

The present invention relates to a method and system for automating the management of an inventory of consumer items at a consumer location.

BACKGROUND

With the many advances in the computer field today, many devices are becoming computerized that in the past were not computerized. For example, electronic organizers and handheld computers are now available to the general consumer. In the future, it is expected that many household items, including appliances, will utilize computer technology to provide the consumer with smart or intelligent devices.

As smart device technology is still in its early stages, there is a need for new intelligent devices that assist the user in day-to-day activities.

SUMMARY

It is, therefore, an object of the present invention to provide a method and system for automating the management of an inventory of consumer items at a consumer location using a programmed device that accepts input data and executes control logic for automating inventory management.

In carrying out the above object, a method for automating the management of an inventory of consumer items is provided. The method comprises receiving at least one shopping list including at least one item, and establishing a shopping list trend based on the at least one shopping list. The method further comprises generating a smart list with control logic, in accordance with the shopping list trend, such that the smart list is predicative of a next shopping list. That is, in accordance with the method, a programmed device accepts input data and executes control logic for automating inventory management of, for example, groceries or other items that are purchased on a regular basis.

In one embodiment, the method further comprises determining a shopping list of a shopping trip, storing information indicative of the shopping list on a data storage medium. Thereafter, the information is retrieved from the data storage medium. For example, the data storage medium may be a smart card having a magnetic strip that is scanned at the store location, and is later processed by control logic at the user home.

In another embodiment, the method further comprises determining a shopping list of a shopping trip, and sending information indicative of the shopping list over a network. Thereafter, the information is received from the network at the control logic at the user location. That is, the store and consumer location may be connected over a network, such as the Internet, so that shopping list information may be automatically sent between the store and the consumer location or residence, or kept remotely and sent to the consumer location on demand.

The control logic may generate the smart list based on consumer shopping patterns (a series of shopping lists received from different shopping trips by the consumer). Alternatively, generating the smart list may be further based on consumed item lists. This alternative method further comprises receiving at least one consumed item list including at least one item that has been consumed. For example, receiving the at least one consumed item list may be performed by identifying an item upon consumption thereof. The item, for example, has a tag and the item is identified by recognizing the tag. For example, the tag may be a bar code, a magnetic strip or even a radio device. Alternatively, the at least one consumed item may be identified upon consumption thereof by recognizing the item with a camera.

To help the control logic establish the shopping list trend, the method preferably further comprises comparing the smart list generated by the control logic with the next shopping list. That is, the smart list that the control logic predicted for the next shopping list is compared to the actual next shopping list when the consumer shops. Thereafter, the shopping list trend is modified based on the comparison.

Still further, in an embodiment of the present invention, generating the smart list further comprises receiving a plurality of item price lists from a corresponding plurality of shopping locations. A shopping location may be recommended based on a plurality of item price lists and the smart list. Still further, generating the shopping list may include receiving an item list for a recipe, and generating the smart list further based on the item list for the recipe.

Further, in carrying out the present invention, a system for managing an inventory of consumer items at a consumer location is provided. The system comprises control logic operative to receive at least one shopping list including at least one item. The control logic is further operative to establish a shopping list trend based on the at least one shopping list, and to generate a smart list in accordance with the shopping list trend such that the smart list is predicative of a next shopping list.

The at least one shopping list may be received, for example, from a data storage medium or over a network connection. Further, preferably, the control logic is further operative to receive at least one consumed item list including at least one item that has been consumed, and the shopping list trend is appropriately further based on the at least one consumed item list. The consumed item list may be generated by identifying an item upon consumption thereof with, for example, a scanner that recognizes a tag on the item or a camera that recognizes the item.

Further, the system control logic is preferably operative to compare the smart list with the next shopping list, and to modify the shopping list trend based on the comparison. That is, the control logic learns the shopping list trend based on mistakes in its predictions of the next shopping list. And further, preferred embodiments of the system use the control logic to prepare price lists and recommend a shopping location, and also use the control logic to receive recipes and generate shopping lists based on recipes.

The system control logic preferably is a smart device sized for integration with a home appliance, such as a refrigerator. In the alternative, the control logic may be a computer program on a computer readable storage media having information stored thereon representing instructions. The instructions, which are the control logic, are executed by the computer to manage consumer item inventory. When the control logic is a smart device integrated with a home appliance, the smart device may be provided with a display for displaying the smart list. Further, in a preferred embodiment, the smart device receives information over a network connection, and may be on a local network with other devices in the home.

The advantages associated with embodiments of the present invention are numerous. For example, embodiments of the present invention allow a consumer to have shopping lists generated automatically by control logic. The control logic may be a smart device and/or a computer program. Advantageously, the control logic establishes a shopping trend based on the consumer's buying habits (and alternatively further based on consumption habits). Preferably, the smart device is configured with an open software interface. For example, a smart device connected to a home network may interface with various software applications on a home computer to allow the smart list generation to consider and co-mingle various inputs in addition to shopping habits. For example, budget software and diet planning software are two examples of software that could provide additional input to the smart device.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 5 is a block diagram illustrating a preferred embodiment of the present invention wherein the shopping list trend is based in part on consumed item information;

FIG. 6 is a block diagram illustrating a preferred embodiment of the present invention where the shopping list trend is modified based on the comparison of the smart list with the next shopping list;

FIG. 7 is a block diagram illustrating recommending a shopping location in accordance with the present invention;

FIG. 8 is a block diagram illustrating generating the smart list further based on an item list for a recipe in accordance with the present invention.

DETAILED DESCRIPTION

Figure 1:
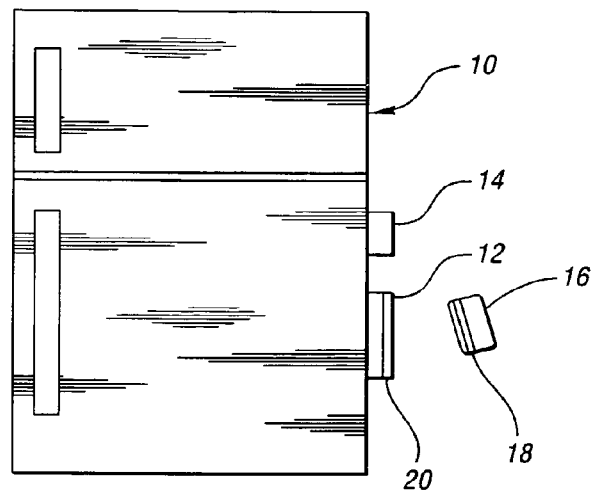
FIG. 1 is a refrigerator having a smart device attached thereto for automating the management of an inventory of consumer items using control logic of the smart device that accepts input data and generates a smart shopping list.

With reference to FIG. 1, a refrigerator is generally indicated at 10. A system of the present invention for managing an inventory of consumer items at a consumer location includes a programmed device or smart device 12. Device 12 accepts input data and executes control logic for automating inventory management. Preferably, reading device 14 is provided to recognize items as they are consumed or used. Device 14 may be in the form of a camera or a scanner if each item has a bar code thereon. Further, other types of tags and appropriate tag recognition devices are contemplated. In the embodiment illustrated, a computer readable storage medium 16, in the form of a card having a magnetic strip 18, is slid through slot 20 on device 12 to provide shopping list information to device 12.

In this embodiment, the consumer may carry card 16 in a wallet or purse, along with credit cards and the like, to the store. At the store, upon checking out and paying for goods, card 16 may be slid through a device at the store which puts information on the magnetic strip 18 indicative of the items just purchased. Upon returning home, card 16 may be passed through slot 20 of device 12 to give this information to device 12. Device 12 executes control logic in accordance with the present invention to establish a shopping list trend and predict a smart list that is predicative of a future shopping list. Of course, although as shown, the smart device 12 is integrated with an appliance, for example, refrigerator 10, it is appreciated that device 12 may be a stand alone device or may be a computer program, or may be implemented in various control logic portions that are spread out over more than one device.

It is to be appreciated that over time, as the consumer makes numerous shopping trips and provides the purchased item shopping list information to smart device 12, smart device 12 uses control logic to establish a shopping trend and then predicts future shopping lists. Preferably, reader 14 is used to track when items are used and also provide that information to smart device 12 to help make the smart list more accurate.

Further, it is possible to make the smart device ignore certain shopping lists or particular items off of a shopping list. For example, when shopping for a party, it may be desirable to ignore the entire list or certain items on the list to prevent the data from skewing the predictive control.

Figure 2:
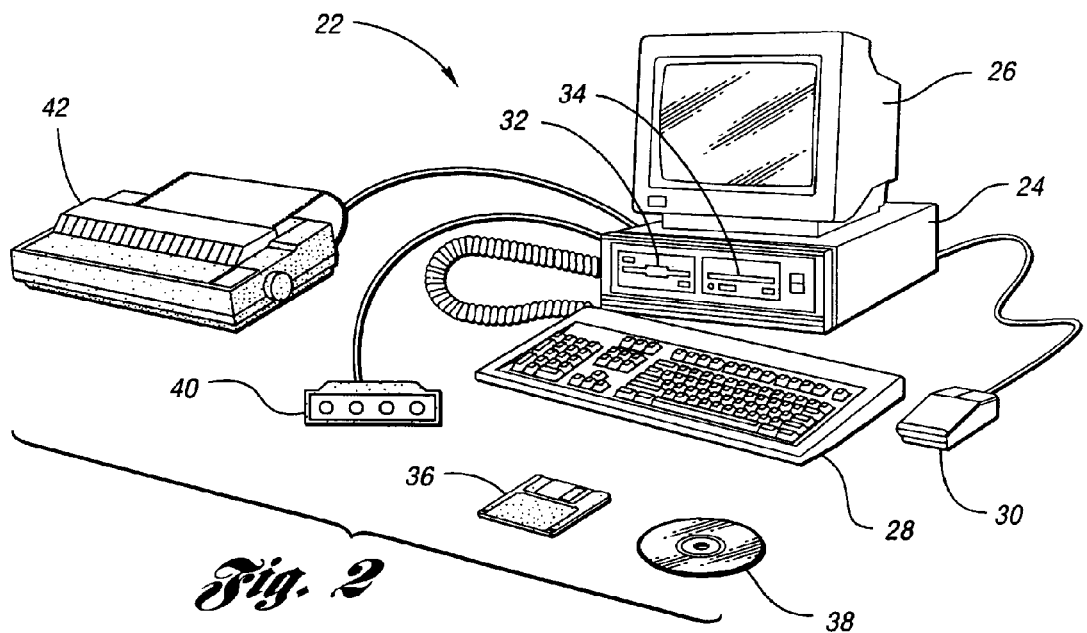
FIG. 2 is a computer operative to execute control logic stored on a computer readable storage medium to automate inventory management of consumer items.

As mentioned previously, the control logic may be in the form of instructions on a computer readable storage medium as best shown in FIG. 2. A computer is generally indicated at 22. Computer 22 includes a desktop case 24 that contains a processor, memory, and appropriate computer architecture as is well known in the art of computer hardware. Computer 22 may include any number of different storage media readers and associated storage media, such as a floppy disk drive 32 and a compact disk read-only memory drive 34. Further, computer 22 may include a hard disk drive (not specifically shown). Floppy disk drive 32 is used to read computer readable storage media in the form of a floppy disk 36. Compact disk read-only memory drive 34 is used to read computer readable storage media in the form of a compact disk 38. The control logic for embodiments of the present invention may be stored on any type of media that is readable by computer 22. Further, the shopping list information may be received by computer 22 in any format such as on a computer disk, or received over a network such as the Internet to a network interface card. That is, the present invention is independent of any particular form for the control logic, and independent of any particular technique for sending/receiving shopping list information.

It is to be appreciated, however, that in the preferred embodiment, shopping list information is received over a network. Further, it is appreciated that computer 22 may connect to a network, or smart device 12 (FIG. 1) may connect to a network to receive data.

Computer 22 further includes input devices, for example, a keyboard 28 and a mouse 30 are provided. Computer 22 may interface to other networks such as the Internet through a network interface card (not specifically shown) or a modem 40. Still further, information may be displayed to the user on any type of output device, such as display device 26 or printer 42. Of course, the configuration of computer 22 is exemplary, as many configurations are suitable.

In FIG. 2, a program is executed by computer 22 to provide the same functionality as that provided by smart device 12 and associated components shown in FIG. 1. In FIGS. 3-8, preferred methods are described. These methods may be performed at the consumer location using a programmed device that accepts input data and executes control logic for automating inventory management. For example, computer 22 or smart device 12 may be used to achieve embodiments of the present invention. Further, device 12 may have a data connection to computer 22, and the smart device and the computer may cooperate to achieve embodiments of the present invention.

Figure 3:
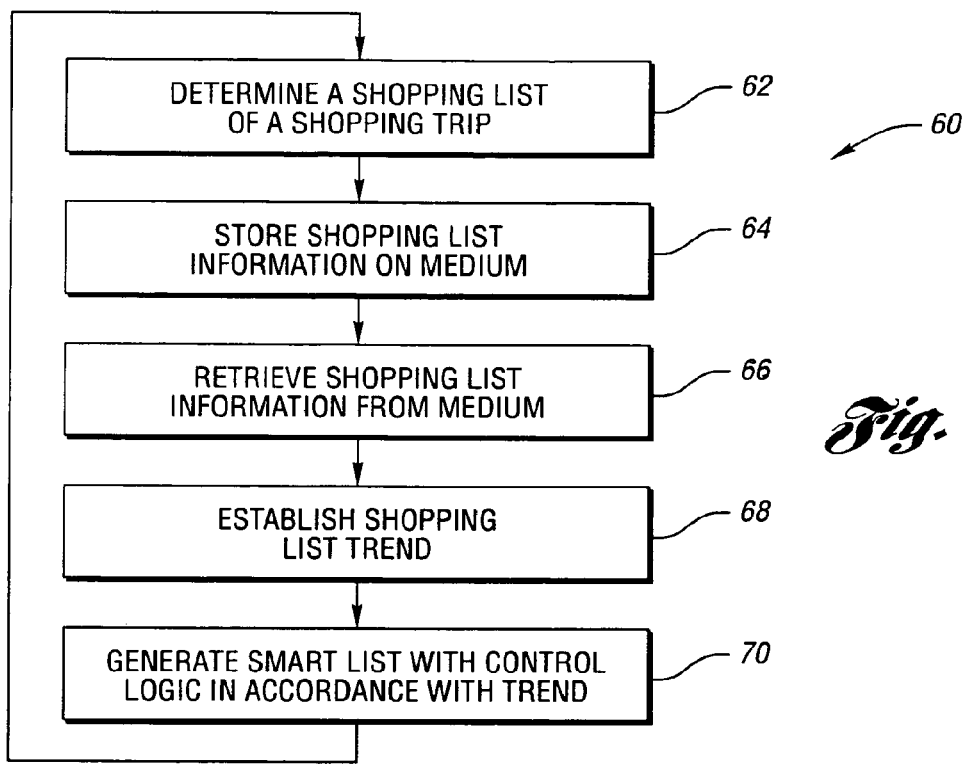
FIG. 3 is a block diagram illustrating a method of the present invention for automating inventory management of consumer items.

Referring to FIG. 3, a first method of the present invention is generally indicated at 60. At block 62, a shopping list of a shopping trip is determined. The shopping list may be determined when the customer checks out at the grocery (or other) store so that the shopping list accurately lists each item that was purchased by the consumer. The inventors believe that embodiments of the present invention are suitable for groceries and other items purchased at the grocery store such as perishable items, and including any items that are purchased on a regular basis for use at the consumer home. At block 64, the store shopping list information is put on a data storage medium. The data storage medium may be a credit card sized card having a magnetic strip thereon. Alternatively, the storage medium may be a computer disk or known type of data storage medium including solid-state devices.

At block 66, after the consumer returns home, the shopping list information is retrieved from the storage medium. That is, if a credit card sized magnetic strip card is used as the medium, the card is run through a card reader. If a computer disk is used as the medium, the stored file is read off the disk with the appropriate computer disk drive (floppy, CDROM, CD-RW, DVD, etc.). That is, an appropriate reader is used to read the shopping list information and provide that information to the system control logic, which may be a programmed smart device, or a computer program. Of course, it is appreciated that the programmed smart device may be in the form of application specific control logic. That is, programming could be in hardware, firmware, software, or combinations thereof.

At block 68, a shopping list trend is established. The shopping list trend is established when the control logic is executed and the shopping list along with previous shopping lists and any other inputs are examined by the control logic to establish the shopping list trend. At block 70, a smart list is generated with the control logic, in accordance with the shopping list trend, such that the smart list is predictive of a next shopping list. It is possible that the smart list is generated by looking at shopping lists established at the checkout counter. Of course, additional information such as consumed item lists and previous differences between the generated smart list and the next shopping list may be used to help establish the shopping list trend.

Further, the generated shopping list may also be further based on user input. For example, the user could input an approximate time between the present shopping trip and a future shopping trip. Accordingly, the generated list should include sufficient quantity of items to avoid shortages until the future trip with a safety margin of a preselected number of days.

Figure 4:
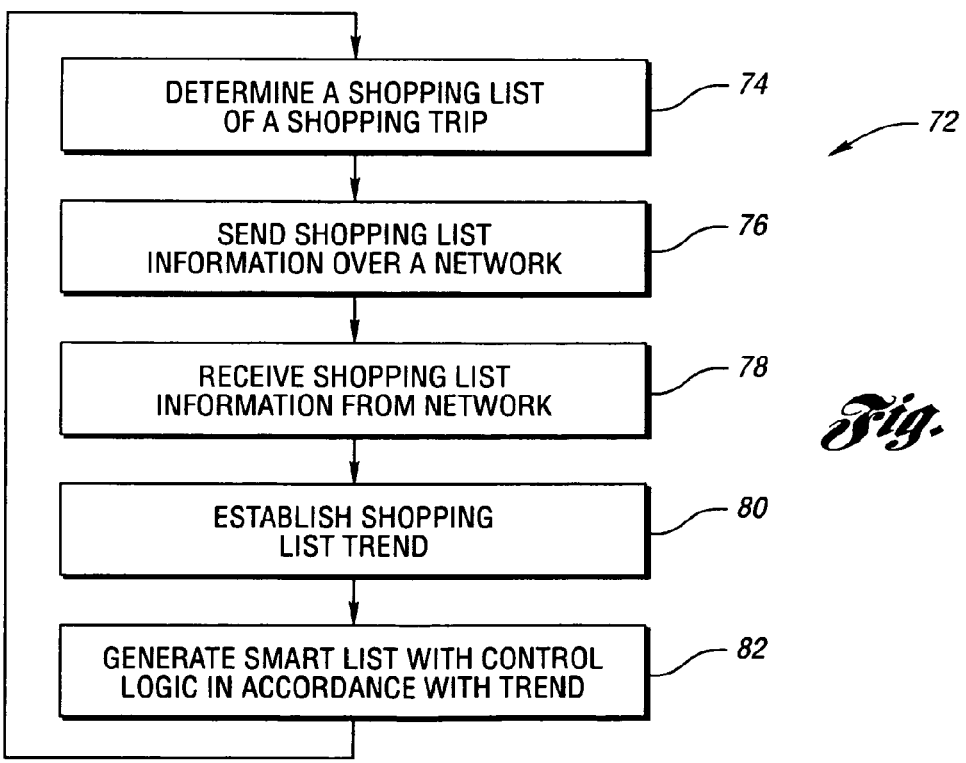
FIG. 4 is a block diagram of a preferred method of the present invention for automating inventory management of consumer items that utilizes a network connection.

With reference to FIG. 4, a second method of the present invention is generally indicated at 72. At block 74, a shopping list is determined for a shopping trip. At block 76, the shopping list information is sent over a network. For example, the shopping list information may be sent over a data network, such as the Internet, so as to allow the smart device or program executing on a computer to retrieve the shopping list information. Further, the information may be sent directly to the inventory management system or may be stored somewhere on the network for later retrieval by the consumer from the network. Further, for example, in an alternative, the information may be sent at least partially over the public switched telephone network (PSTN) to reach the smart device from the store. In any available fashion, the shopping list information is received from the network at block 78.

At block 80, the shopping list trend is established, and at block 82 the smart list is generated with control logic, in accordance with the trend. As mentioned previously, and as best shown in FIG. 5, in a preferred method generally indicated at 90, consumed item information is used to establish the shopping list trend in addition to purchased item information. At block 92, a consumed item is identified by, for example, a camera or a bar code scanner or other recognition device. At block 94, consumed item information is received at the smart device. At block 96, the shopping list trend is established further based on the consumed item information in addition to the purchased item information.

With reference to FIG. 6, a block diagram of preferred operations of the control logic is generally indicated at 100. At block 102, the smart list is compared with the next shopping list. That is, the control logic (on either a smart device or within a computer program) generates a smart list. After a shopping trip, the smart device compares the generated smart list with the actual shopping list that was generated at the checkout counter. At block 104, the shopping list trend may be modified based on the comparison. That is, when the smart device expected certain items to be purchased, and the consumer did not purchase those items, the smart device learns a little more about the shopper's buying habits, and modifies the shopping trend accordingly.

Further, when the generated shopping list is correct in its prediction for the shopping list, the smart device may weigh the established trend even heavier, making the trend less susceptible to minor deviations in buying habits in the near future. That is, if the smart device is correct in its prediction of the purchase of certain items over a long period of time, only a few occurrences of these items not being purchased upon the prediction of their purchase will not greatly affect the shopping trend because correct predictions result in a more heavily weighed trend. Of course, preferably the user has the option of not allowing certain unpredicted purchases affect the trend. For example, the user may desire that a shopping trip just before a large family get together doesn't affect the established shopping trend or may desire that certain items from a particular shopping list do not affect the trend.

With reference to FIG. 7, as generally indicated at 110, an alternative embodiment of the present invention receives item price lists from a plurality of shopping locations as indicated at block 112. At block 114, a shopping location is recommended based on the smart list and price lists. Of course, the shopping location may be recommended further based on store location or consumer preferences. For example, a consumer may prefer certain stores much more than other stores. As such, the smart device would not recommend the nonpreferred stores unless the price savings were so great so as to outweigh the customer's preference of the other stores.

As best shown in FIG. 8, a block diagram generally indicated at 120 indicates another optional feature of the present invention. At block 122, an item list for a recipe is received by the smart device. At block 124, the smart list is generated further based on the item list for the recipe.

It is to be appreciated that embodiments of the present invention may establish a shopping trend based on buying and using habits of a consumer. Preferably, the shopping trend is modified by weighing the trend based on good and bad decisions by the control logic. Further, in an alternative embodiment, the consumer may train or teach the smart device by changing or suggesting items directly (instead of comparing after shopping). In accordance with the present invention, purchases of consumer items for use in the household are integrated with an intelligent agent in the home.

The intelligent agent may be in the form of a smart device that is standalone or integrated with an appliance, or may be in the form of a program executable by a computer or other device capable of executing instructions. In a prototype, the inventors have found that a smart device at a refrigerator, and an under the sink scanner make a suitable implementation for the present invention. The smart device on the refrigerator may have a display, such as a liquid crystal display. Further, the smart device may have an open software interface such that other software may provide additional input. For example, budget software or dietary software may provide input to the smart device.

Figure 9:
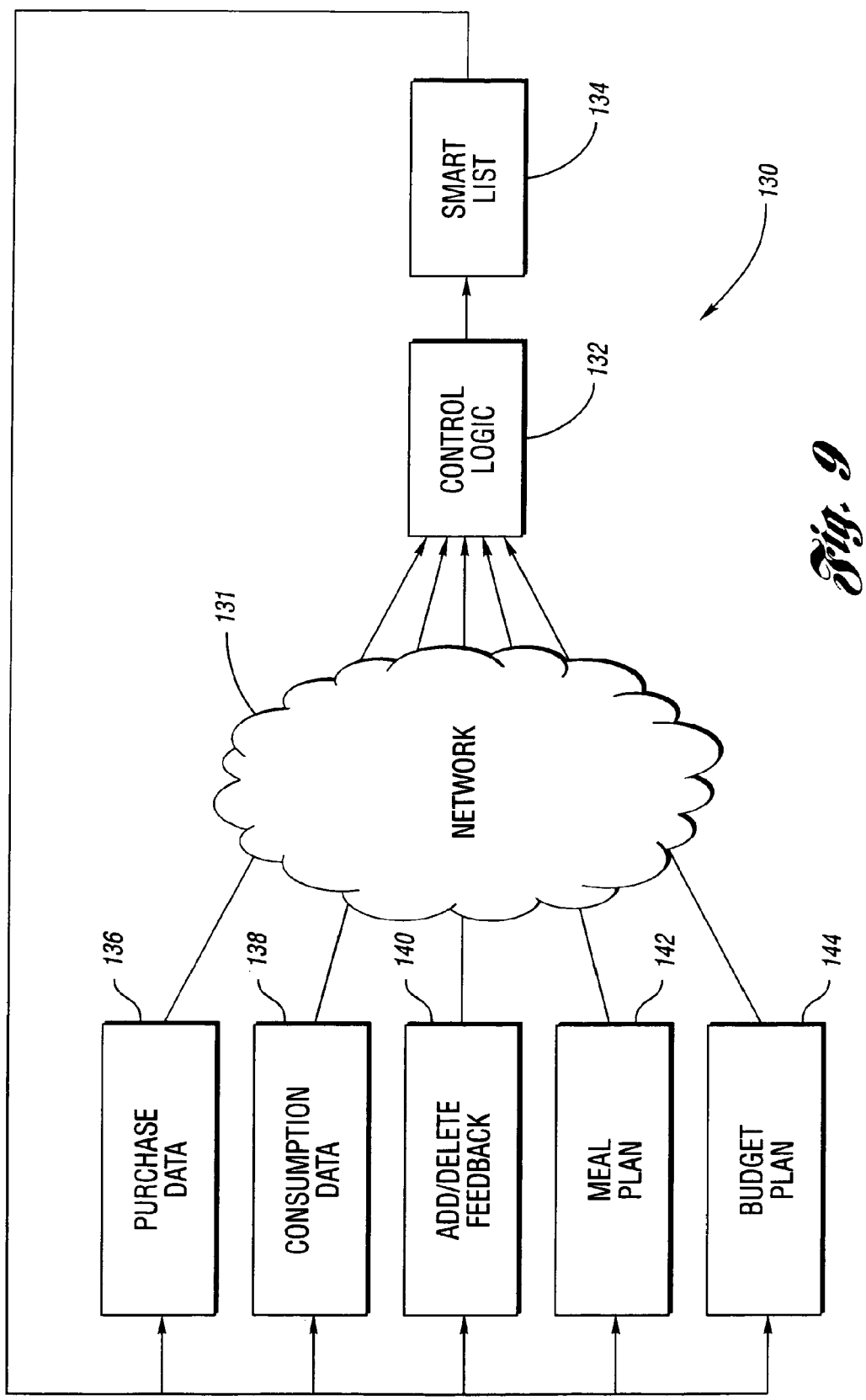
FIG. 9 is a block diagram illustrating the general flow of information to the control logic, and the generation of the smart list.

In general, as shown in FIG. 9, the present invention generates a smart list as generally indicated in block diagram 130. Control logic 132, which may take a number of different forms, generates smart list 134. The smart list trend is established based on a number of inputs. Five exemplary inputs are shown in communication with control logic 132 over network 131, but others are contemplated. Purchase data 136 may help establish a purchasing pattern, while consumption data 138 may be provided as additional data for control logic 132. Still further, user feedback 140 may tell the control logic how well it is doing with the smart list generation. Even further, an open software interface may allow additional inputs such as meal plan information 142 and budget plan information 144.

Figure 10:
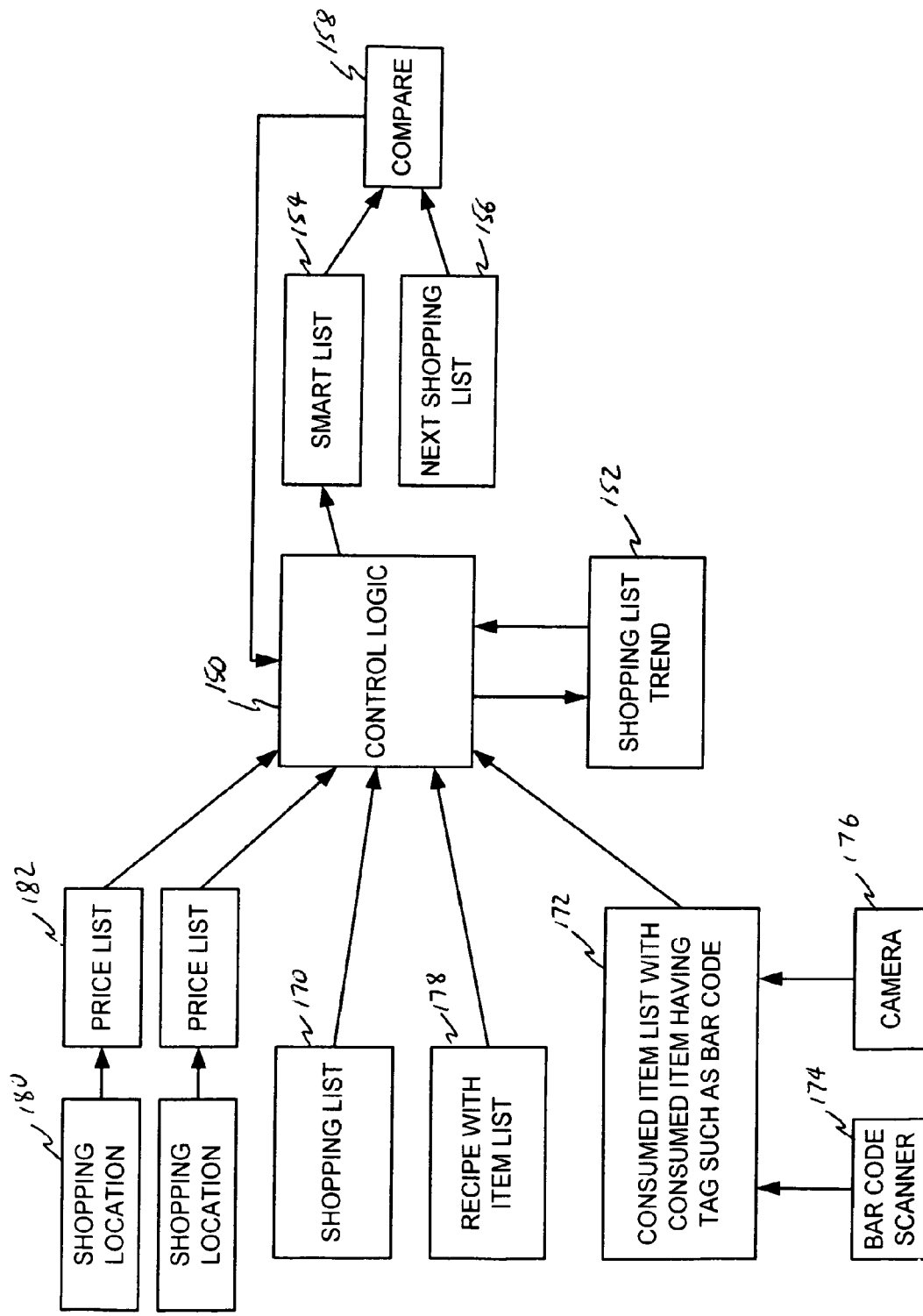
FIG. 10 is a block diagram illustrating control logic managing a shopping list trend and generating an output list or smart list.

FIG. 10 illustrates various aspects of preferred embodiments of the present invention. Control logic 150 establishes shopping list trend 152 and generates output list or smart list 154 to be predictive of next shopping list 156. Lists 154 and 156 are compared at block 158 and control logic 150 modifies shopping list trend 152 as needed. Control logic 150 receives various information including price lists 182 from shopping locations 180, shopping list 170, recipe with item list 178, consumed item list with consumed items having tags 172. Tags may be bar codes recognized by bar code scanner 174 or alternatively a camera 176 may recognize items.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method, comprising:
   receiving, by a computing device, a series of shopping lists, each shopping list including at least one item;
   establishing, by the computing device, a shopping list trend based on the series of shopping lists;
   generating, by the computing device, an output list in accordance with the shopping list trend such that the output list is predictive of a next shopping list;
   receiving, by the computing device, a plurality of item price lists from a corresponding plurality of stores; and
   providing, by the computing device, a recommendation of a store based on the plurality of item price lists and the output list.

2. The method of claim 1, wherein receiving the series of shopping lists includes:
   determining a shopping list of a shopping trip;
   storing information indicative of the shopping list on a data storage medium; and
   thereafter, retrieving the information from the data storage medium.

3. The method of claim 1, wherein receiving the series of shopping lists includes:
   determining a shopping list of a shopping trip; and
   sending information indicative of the shopping list over a network.

4. The method of claim 1, further comprising:
   receiving at least one consumed item list including at least one item that has been consumed, wherein the shopping list trend is further based on the at least one consumed item list.

5. The method of claim 4, wherein receiving the at least one consumed item list includes:
   identifying an item upon consumption thereof, the item having a tag and the item being identified by recognizing the tag.

6. The method of claim 5, wherein the tag is a bar code and the tag is recognized by scanning the bar code.

7. The method of claim 4, wherein receiving the at least one consumed item list includes:
   identifying an item upon consumption thereof by recognizing the item with a camera.

8. The method of claim 1, further comprising:
   comparing the output list with the next shopping list; and
   modifying the shopping list trend based on the comparison.

9. The method of claim 1, wherein generating the output list includes:
   receiving an item list for a recipe; and
   generating the output list further based on the item list for the recipe.

10. An apparatus, comprising:
    at least one processor; and
    memory storing computer-readable instructions that, when executed by the at least one processor, cause the apparatus to:
    receive a series of shopping lists, each shopping list including at least one item;
    establish a shopping list trend based on the series of shopping lists;
    generate an output list in accordance with the shopping list trend such that the output list is predictive of a next shopping list;
    receive a plurality of item price lists from a corresponding plurality of stores; and
    provide a recommendation of a store based on the plurality of item price lists and the output list.

11. The apparatus of claim 10, wherein receiving the series of shopping lists includes:
    determining a shopping list of a shopping trip;
    storing information indicative of the shopping list on a data storage medium; and
    thereafter, retrieving the information from the data storage medium.

12. The apparatus of claim 10, wherein receiving the series of shopping lists includes:
   determining a shopping list of a shopping trip;
   sending information indicative of the shopping list over a network; and
   receiving the information from the network.

13. The apparatus of claim 10, wherein the memory stores additional computer-readable instructions that, when executed by the at least one processor, further cause the apparatus to:
   receive at least one consumed item list including at least one item that has been consumed, wherein the shopping list trend is further based on the at least one consumed item list.

14. The apparatus of claim 13, wherein receiving the at least one consumed item list includes:
   identifying an item upon consumption thereof, the item having a tag and the item being identified by recognizing the tag.

15. The apparatus of claim 14, wherein the tag is a bar code and the tag is recognized by scanning the bar code.

16. The apparatus of claim 13, wherein receiving the at least one consumed item list includes:
   identifying an item upon consumption thereof by recognizing the item with a camera.

17. The apparatus of claim 10, wherein the memory stores additional computer-readable instructions that, when executed by the at least one processor, further cause the apparatus to:
   compare the output list with the next shopping list; and
   modify the shopping list trend based on the comparison.

18. The apparatus of claim 10, wherein generating the output list includes:
   receiving an item list for a recipe; and
   generating the output list further based on the item list for the recipe.

19. A method, comprising:
   receiving, by a computing device, a series of shopping lists, each shopping list including at least one item;
   receiving, by the computing device, instructions to ignore certain items of the series of shopping lists;
   establishing, by the computing device, a shopping list trend based on the series of shopping lists and the instructions to ignore certain items of the series of shopping lists;
   generating, by the computing device, an output list in accordance with the shopping list trend, the output list being predictive of a next shopping list;
   receiving, by the computing device, a plurality of item price lists from a corresponding plurality of stores; and
   providing, by the computing device, a recommendation of a store based on the plurality of item price lists and the output list.

20. The method of claim 19,
   wherein establishing the shopping list trend is further based on consumed item information, and,
   wherein generating the output list is additionally based on one of budget or dietary information.

* * * * *